UNITED STATES PATENT OFFICE.

WILHELM ALEXANDER FELIX BLEECK, OF BRISBANE, QUEENSLAND, AUSTRALIA.

PRIMARY BATTERY.

1,021,859.  Specification of Letters Patent.  Patented Apr. 2, 1912.

No Drawing.   Application filed June 25, 1909.   Serial No. 504,372.

*To all whom it may concern:*

Be it known that I, WILHELM ALEXANDER FELIX BLEECK, a subject of the King of Great Britain, residing at Brisbane, in the State of Queensland, Commonwealth of Australia, have invented certain new and useful Improvements in Primary Batteries; and I do hereby declare the following to be a full, clear, and exact description of the invention, such as will enable others skilled in the art to which it appertains to make and use the same.

My invention relates to two-fluid batteries in which the positive element consists of zinc immersed in a solution of caustic soda, and the negative element of carbon immersed in a depolarizing solution which is separated from the caustic soda by a porous partition. According to the present invention such batteries are provided with a depolarizer, which consists of a mixture or combination of chromic acid, water and hydrochloric acid together with a mixture of ferrous and nickel sulfates. Some latitude is allowable in the proportions of the constituents of the improved depolarizer, but they should approximate to those given in the following prescription:—Five ounces by measure of commercial hydrochloric acid are mixed with 15 ounces by measure of water; in this mixture is dissolved one ounce by weight of metal sulfate, by which is meant a mixture of ferrous and nickel sulfates in any proportions, and eight ounces by weight of commercial chromic acid are subsequently added to the solution. Practical tests have shown that with the use of a mixture of ferrous and nickel sulfates a better ampere hour output is obtained, provided the above-stated proportions are not exceeded.

In carefully conducted tests when a mixture of the two sulfates was employed an initial electromotive force of 2.625 volts per cell was obtained. If either sulfate was used separately, an initial electromotive force of 2.6 volts per cell was obtained.

In order to minimize the rate of diffusion of the liquids through the porous partition separating them, which results in a fall in the level of the excitant and consequent reduction of the active area of the positive element and increase of internal resistance, and a corresponding rise of level of the depolarizer and consequent weakening of its depolarizing power through admixture with the excitant, a small quantity of gum arabic solution is preferably added to the excitant, particularly in the case of batteries which are not discharged at a high rate. With this object the excitant is best made up as follows: To ten ounces by measure of water is added one ounce of liquid gum arabic of a density which should not sensibly exceed 1.125; to this are added 5 ounces by weight of commercial caustic soda, and the solution then allowed to cool before using.

I claim:—

In a two fluid battery comprising zinc in an excitant solution of caustic soda and a suitable complementary electrode separated therefrom by a porous pot, a depolarizer comprising chromic acid, water and hydrochloric acid with a mixture of ferrous and nickel sulfates.

In testimony whereof, I affix my signature, in presence of two witnesses.

WILHELM ALEXANDER FELIX BLEECK.

Witnesses:
 ALEXANDER ANDERSON,
 ARTHUR BISHOP.